US007243067B1

(12) United States Patent
Weinmann et al.

(10) Patent No.: US 7,243,067 B1
(45) Date of Patent: Jul. 10, 2007

(54) METHOD AND APPARATUS FOR WIRELESS TRANSMISSION OF MESSAGES BETWEEN A VEHICLE-INTERNAL COMMUNICATION SYSTEM AND A VEHICLE-EXTERNAL CENTRAL COMPUTER

(75) Inventors: Ulrich Weinmann, Eching (DE); Mike Peters, Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1315 days.

(21) Appl. No.: 09/617,752

(22) Filed: Jul. 17, 2000

(30) Foreign Application Priority Data

Jul. 16, 1999 (DE) ................................ 199 33 318

(51) Int. Cl.
*G10L 13/00* (2006.01)
*G10L 15/00* (2006.01)

(52) U.S. Cl. .................... 704/231; 704/258; 704/270.1; 379/88.01; 379/88.16

(58) Field of Classification Search ................ 704/231, 704/235, 251, 254, 258, 260, 270, 270.1, 704/275; 379/88.16, 88.01
See application file for complete search history.

(56) References Cited

U.S. PATENT DOCUMENTS

| | | | | |
|---|---|---|---|---|
| 5,592,585 | A | 1/1997 | Van Coile et al. | |
| 5,732,216 | A * | 3/1998 | Logan et al. | 709/203 |
| 5,784,691 | A | 7/1998 | Rühl | |
| 5,884,262 | A * | 3/1999 | Wise et al. | 704/270.1 |
| 5,911,129 | A * | 6/1999 | Towell | 704/270.1 |
| 5,933,805 | A * | 8/1999 | Boss et al. | 704/249 |
| 6,018,710 | A * | 1/2000 | Wynblatt et al. | 704/260 |
| 6,061,718 | A * | 5/2000 | Nelson | 709/206 |
| 6,081,780 | A * | 6/2000 | Lumelsky | 704/260 |
| 6,216,013 | B1 * | 4/2001 | Moore et al. | 455/557 |
| 6,236,968 | B1 * | 5/2001 | Kanevsky et al. | 704/275 |
| 6,246,672 | B1 * | 6/2001 | Lumelsky | 370/310 |
| 6,246,983 | B1 * | 6/2001 | Zou et al. | 704/260 |
| 6,366,882 | B1 * | 4/2002 | Bijl et al. | 704/235 |
| 6,415,021 | B1 * | 7/2002 | Oh | 379/88.13 |
| 6,529,143 | B2 * | 3/2003 | Mikkola et al. | 340/995.1 |
| 6,539,080 | B1 * | 3/2003 | Bruce et al. | 379/88.17 |
| 6,563,770 | B1 * | 5/2003 | Kokhab | 369/30.08 |
| 6,625,257 | B1 * | 9/2003 | Asaoka et al. | 379/88.01 |
| 7,027,568 | B1 * | 4/2006 | Simpson et al. | 379/88.16 |
| 2002/0087655 | A1 * | 7/2002 | Bridgman et al. | 709/217 |

FOREIGN PATENT DOCUMENTS

| | | |
|---|---|---|
| DE | 195 27 187 | 1/1997 |
| EP | 0 655 696 | 5/1995 |
| EP | 0901000 | 3/1999 |
| FR | 2 573 886 | 5/1986 |
| JP | 63-272129 | 11/1988 |

* cited by examiner

*Primary Examiner*—Martin Lerner
(74) *Attorney, Agent, or Firm*—Crowell & Moring LLP

(57) ABSTRACT

In a method and apparatus for wireless transmission of messages between a vehicle-internal communication system and a vehicle-external central computer, the vehicle-internal communication system has acoustic output unit for the playback of a received message. In the vehicle-external central computer, the message, which is at first present in text form and is to be sent to the vehicle-internal communication system, is transformed into a phonetic transcription; the phonetic transcription, is then transmitted to the vehicle-internal communication system. In the vehicle internal communication system, the phonetic transcription is transformed to speech and is emitted via the acoustic output unit. Spoken messages from a vehicle occupant are recorded via an acoustic input unit, processed and transmitted to the central computer by reversal of the same process.

7 Claims, 1 Drawing Sheet

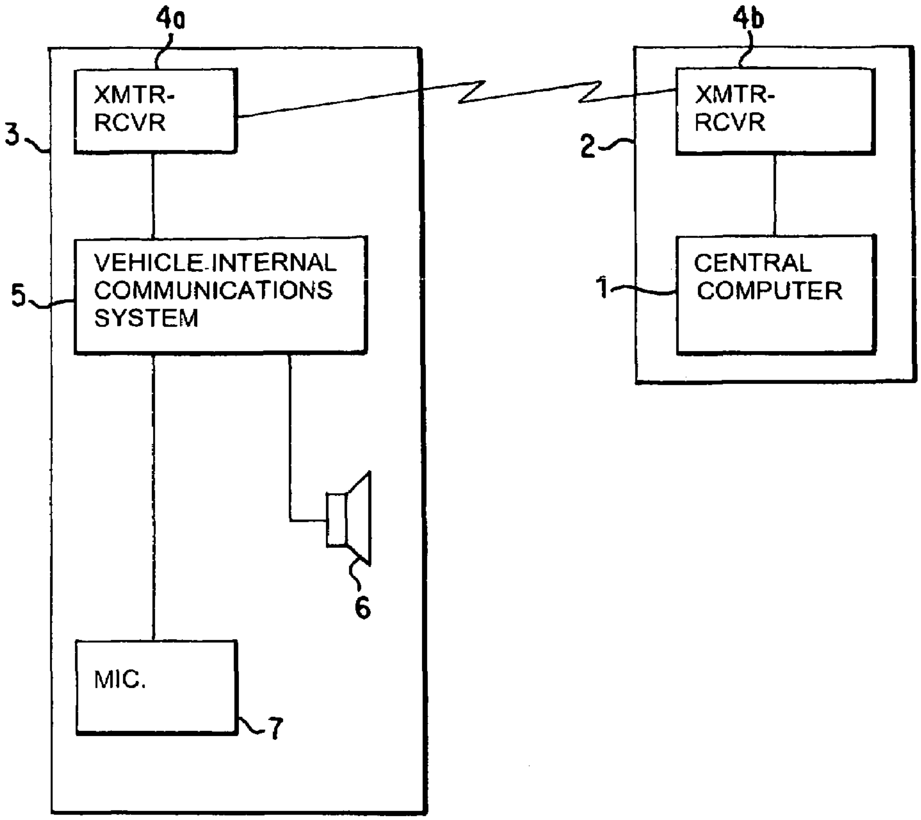
4a
XMTR-
RCVR
3
VEHICLE INTERNAL
COMMUNICATIONS
SYSTEM
5
6
MIC.
7
4b
XMTR-
RCVR
2
CENTRAL
COMPUTER
1

METHOD AND APPARATUS FOR WIRELESS TRANSMISSION OF MESSAGES BETWEEN A VEHICLE-INTERNAL COMMUNICATION SYSTEM AND A VEHICLE-EXTERNAL CENTRAL COMPUTER

BACKGROUND AND SUMMARY OF THE INVENTION

This application claims the priority of German patent document 199 33 318.1, filed 16 Jul. 1999, the disclosure of which is expressly incorporated by reference herein.

The invention relates to a process for wireless transmission of messages between a vehicle-internal communication system and a vehicle-external central computer.

Wireless transmission processes of this general type have been known for a long time, for example, in connection with the RDS (Radio Data System). By means of the RDS, for example, up-to-date traffic information can be delivered to the driver in the form of speech.

Furthermore, processes are generally known for electronically generating a spoken text and for transforming text to speech (TTS=TEXT-TO-SPEECH) in which the text is first transformed to phonetic transcription (phonetic-prosodic parameters), and the phonetic transcription is then transformed to speech. Such a process is described, for example, in U.S. Pat. No. 5,592,585, the entire disclosure of which is incorporated by reference herein. In the '585 patent, the two steps referred to above are carried out by a single special computer.

In the future, the transmission and reception of fairly long text messages (for example, dictated texts and/or E-mail messages) is to be permitted in motor vehicles. However, the acts of inputting text via a keyboard for sending a message, and of reading the text of a received message draws the driver's attention away from the traffic situation particular during the drive. It is therefore desirable to provide a vehicle mounted arrangement which permits the acoustical sending of messages which are to arrive at the recipient in the form of text, and the acoustical delivery of messages which are worded by the sender in the form of a text.

Conventional systems for accomplishing this purpose would require a speech recognition system and a TEXT-TO-SPEECH system in the vehicle, which would considerably expand the system expenditures of a vehicle-internal communication system. This is undesirable, however, because such a communication system should also perform a variety of additional functions, such as the operation of a navigation system and/or of a telephone system.

It is an object of the invention to permit the acoustical sending and receipt of relatively long text messages on board a vehicle, by means of a vehicle-internal communication system and to minimize the computing output of the vehicle-internal communication system required for this purpose.

These and other objects and advantages are achieved by the method and apparatus according to the invention, for wireless transmission of messages between a vehicle-internal communication system and a vehicle-external central computer. The vehicle-internal communication system according to the invention has an acoustic output unit for the playback of a received message. In the vehicle-external central computer, the message, which is at first present in text form and is to be sent to the vehicle-internal communication system, is transformed into a phonetic transcription and is transmitted to the vehicle-internal communication system in the form of the phonetic transcription. In the vehicle-internal communication system, the phonetic transcription is transformed to speech and is emitted via the acoustic output unit. Thus, for example, an E-mail arrived at the central computer can be transmitted to the vehicle and be read out.

The vehicle-internal communication system preferably also has an acoustic input unit by way of which a spoken message from an occupant of the vehicle is recorded and transformed to a phonetic transcription in the vehicle-internal communication system. The phonetic transcription is then transmitted to the vehicle-external central computer which subsequently transforms the message from a phonetic transcription into text and stores it and/or processes it in this form. If, for example, an E-mail message is present, it is transmitted from the central computer to the recipient.

The messages can be stored and managed in the vehicle in the form of phonetic transcription.

An important feature of the invention, is that only lower-expenditure transformation of phonetic transcription to speech and vice-versa is carried out in the vehicle. The high expenditure computing output, which is required for the transformation of the phonetic transcription to text and vice-versa, on the other hand, is shifted to a vehicle-external system which has sufficient computing capacity.

Furthermore, a phonetic transcription plays back speed in the form of compressed audio data. During the sending and receiving of phonetic transcription, the effective bandwidth requirement for the signal transmission can therefore be considerably reduced, whereby the charging times of the vehicle-internal communication system are minimized.

Other objects, advantages and novel features of the present invention will become apparent from the following detailed description of the invention when considered in conjunction with the accompanying drawings.

BRIEF DESCRIPTION OF THE DRAWINGS

The single FIGURE of the drawing shows a system for bidirectional transmission of text/speech messages according to the invention.

DETAILED DESCRIPTION OF THE DRAWINGS

As shown in the FIGURE of the drawing, the system for wireless transmission of messages according to the invention includes a central computer 1 situated at a vehicle external base station 2. The central computer receives or generates a message in textual form (consisting of coded characters), and translates it to a phonetic transcription (that is, a representation of a spoken utterance in which each symbol corresponds to one sound or phoneme). The phonetic transcription is then transmitted to the vehicle 3 via a wireless communication link provided by a pair of transmitter/receiver units 4*a*,4*b*. The phonetic transcription received by the transmitter/receiver unit 4*a* is then provided to the vehicle internal communication system 5, where it is transformed to electrical speech signals, which are then emitted in audible form by a speaker 6.

The process for transmission of spoken messages for delivery via the base station 2 in textual form, is essentially the reverse of the above. That is, a message spoken by a vehicle occupant is recorded by the microphone 7 and input to the vehicle internal communications system 5 where it is transformed into a phonetic transcription. The latter is then transmitted via the wireless communication link 4*a*,4*b* to the central computer 1, where it is translated from the phonetic transcription into a textual message.

As noted previously, an important feature of the invention is that the message in question is transmitted between the vehicle 3 and the base station 2 in the form of a phonetic transcription, and all translation between the phonetic transcription and textual message form is performed at the base station 2. Accordingly, the only computing performed aboard the vehicle is the translation of the message between phonetic transcription form and speech signals, which is much less costly in terms of equipment and computing capacity.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Process for wireless transmission of electronic and spoken mail messages between a vehicle-external central computer and a vehicle-internal communication system, comprising:

presenting an electronic mail message to said central computer;

transforming in said central computer the text message into a phonetic transcription;

transmitting the phonetic transcription of an electronic mail message to the vehicle-internal communication system;

then in the vehicle internal communication system, transforming the phonetic transcription to speech;

emitting the message as audible speech via the acoustic output unit; and transmitting a spoken message to said central computer by transforming the spoken message into a phonetic transcription in the vehicle internal communication system, which transcription is then sent by wireless communication to said central computer.

2. A process for wireless transmission of electronic mail messages between a vehicle-external central computer and a vehicle-internal communication system having an acoustic output unit for the playback of a received electronic mail message which is at first present in text form in the vehicle-external central computer, comprising said central computer transforming the text message into a phonetic transcription;

transmitting the phonetic transcription to the vehicle-internal communication system;

in the vehicle-internal communication system, transforming the phonetic transcription to speech; and emitting the message as audible speech via the acoustic output unit, wherein the vehicle-internal communication system also has an acoustic input unit for recording a spoken message, and further comprising:

transforming a spoken electronic mail message in the vehicle-internal communication system to a phonetic transcription;

transmitting the phonetic transcription to the vehicle-external central computer; and said central computer transforming the phonetic transcription to text for storage or processing it in text form.

3. A method for delivering textual messages to a vehicle occupant in audible form and from the vehicle occupant in spoken form, comprising:

processing a textual electronic mail message in a data processor situated externally to said vehicle to generate a phonetic transcription thereof;

transmitting said phonetic transcription to said vehicle via a wireless communications medium;

processing said phonetic transcription on board the vehicle to generate speech signals;

emitting said speech signals in audible form via an acoustic output unit; and transmitting a spoken message to said central computer by transforming the spoken message into a phonetic transcription in the vehicle internal communication system, which transcription is then sent by wireless communications to said central computer.

4. Apparatus for delivering textual electronic mail messages to a vehicle occupant in audible form and from the vehicle occupant in spoken form, comprising:

a vehicle-external data processor programmed to translate a textual electronic mail message into a phonetic transcription;

a wireless communication link for transmitting the phonetic transcription to the vehicle;

a device situated on board the vehicle, for transforming the phonetic transcription to speech signals;

an acoustic output unit coupled to receive said speech signals and generate audible speech corresponding thereto; and transmitting a spoken message to the vehicle-external data processor by transforming the spoken message into a phonetic transcription on board the vehicle and forwarding the phonetic transcription via the wireless communications link to the vehicle-external data processor.

5. A method for acoustic delivery to a vehicle occupant of textual electronic mail messages generated externally to the vehicle and of messages spoken by an occupant in a vehicle, comprising:

translating said textual message into a phonetic transcription thereof;

processing said phonetic transcription to generate speech signals;

emitting said speech signals in acoustic form via an acoustic output unit;

performing said translating step in a stationary data processor external to the vehicle;

transmitting said phonetic transcription from said data processor to the vehicle via a wireless transmission line;

said processing and emitting steps are performed on board the vehicle; and transmitting a spoken message to said data processor by transforming the spoken message into a phonetic transcription on board the vehicle and forwarding the transcription via the transmission line to said data processor.

6. A method for transmitting to a recipient situated external to a vehicle, a textual electronic mail message corresponding to an audible message spoken by a vehicle occupant, comprising:

recording acoustic speech signals comprising said spoken electronic mail message;

processing said acoustical speech signals to generate a phonetic transcription corresponding thereto; and translating said phonetic transcription into a textual message in a data processor; wherein said recording and processing steps are performed on board the vehicle;

said phonetic transcription is transmitted from said vehicle to said data processor via a wireless transmission link; and said translating step is performed externally to the vehicle.

7. Apparatus for transmitting to a recipient situated external to a vehicle of an electronic mail message generated in spoken form by a vehicle occupant, comprising:

a transducer situated on board the vehicle for transforming audible speech to electrical speech signals;

a processor situated on board the vehicle for transforming said electrical speech signals into a phonetic transcription corresponding thereto;

a data processor situated at a point external to the vehicle and programmed to translate said phonetic transcription to a textual message; and a wireless communication link for transmitting said phonetic transcription from said vehicle to said data processor.

* * * * *